United States Patent
Menge et al.

(10) Patent No.: US 7,750,306 B2
(45) Date of Patent: Jul. 6, 2010

(54) REDUCED EDGE EFFECT DETECTOR

(75) Inventors: Peter R. Menge, Chagrin Falls, OH (US); Michael L. Bush, Newbury, OH (US); Michael Jacobson, Orwell, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 12/205,389

(22) Filed: Sep. 5, 2008

(65) Prior Publication Data

US 2009/0065700 A1    Mar. 12, 2009

Related U.S. Application Data

(60) Provisional application No. 60/967,895, filed on Sep. 7, 2007.

(51) Int. Cl.
    *G01T 1/20*      (2006.01)
(52) U.S. Cl. ...................................... 250/368
(58) Field of Classification Search ................... 250/368
    See application file for complete search history.

(56) References Cited

U.S. PATENT DOCUMENTS

| | | | | |
|---|---|---|---|---|
| 5,012,103 A | * | 4/1991 | Tanaka et al. | 250/368 |
| 5,712,889 A | * | 1/1998 | Lanzara et al. | 378/19 |
| 5,763,887 A | * | 6/1998 | Murphy | 250/366 |
| 5,786,599 A | | 7/1998 | Rogers et al. | |
| 5,861,628 A | * | 1/1999 | Genna et al. | 250/368 |
| 6,369,391 B1 | * | 4/2002 | Hefetz et al. | 250/368 |
| 6,516,044 B1 | | 2/2003 | Lyons | |
| 6,655,675 B2 | * | 12/2003 | Rutten et al. | 250/368 |
| 7,138,638 B2 | | 11/2006 | Juni | |

FOREIGN PATENT DOCUMENTS

| | | | |
|---|---|---|---|
| WO | 9614593 A | 5/1996 | |
| WO | 2005052634 A | 6/2005 | |

OTHER PUBLICATIONS

3M Material Safety Data Sheet Vikuiti Turning Right Angle Film II, 6 pgs, 2006.
3M Innovation, Vikuiti Transmissive Right Angle Film II, 1 pg.
3M Electronic Display Lighting Optical Systems Division, Vikuiti Display Enhancement Films, 3 pgs., 2002.

* cited by examiner

*Primary Examiner*—David P Porta
*Assistant Examiner*—Marcus H Taningco

(57) ABSTRACT

Embodiments of a radiation detector and subassemblies thereof are provided having a scintillator with a face and a reflector constructed and arranged to redirect a majority of light leaving the face of the scintillator at an angle within a range of 45 to 135 degrees compared to the direction in which the light was traveling when it left the face. In other embodiments a method is provided including receiving radiation into a scintillator having a face, producing light with the scintillator in response to the radiation, allowing at least a portion of the light to leave the face, and reflecting a majority of the light leaving the face at an angle within a range of 45 to 135 degrees compared to the direction in which the light was traveling when it left the face with a reflector. Other embodiments are directed to a reflector including a plurality of prisms having a first face and a second face with a barrier on the first face.

22 Claims, 5 Drawing Sheets

REDUCED EDGE EFFECT DETECTOR

CROSS-REFERENCE TO RELATED APPLICATION(S)

The present application claims priority from U.S. Provisional Patent Application No. 60/967,895, filed Sep. 7, 2007, entitled "REDUCED EDGE EFFECT DETECTOR", naming inventors Peter R. Menge, Michael S. Bush, and Michael Jacobson, which application is incorporated by reference herein in its entirety.

BACKGROUND

1. Field of the Disclosure

The present application is generally directed to radiation detectors comprising scintillators.

2. Description of the Related Art

Radiation detectors incorporating scintillators, commonly in the form of single crystal materials, are used in applications ranging from oil well logging to medical imaging. Typically, such detectors include one or more scintillators optically coupled to one or more photodetectors able to convert light into electricity. When such a detector is subjected to a radiation event, the scintillator generates light in response to the radiation, and the photodetectors may convert the light into electricity, which is used to record the event electronically.

Some radiation detectors, such as in medical imaging, are capable of imaging based on a plurality of radiation events. Medical imaging is usually accomplished by introducing into a patient a radiopharmaceutical substance by injection, ingestion, inhalation, or other appropriate means. A radioactive isotope of the radiopharmaceutical selectively migrates to the tissue to be examined and emits gamma radiation from it. The radiation can be sensed and used to generate an image of the tissue to provide diagnostic information for appropriate treatment.

The sensing of radiation from a biological tissue is typically accomplished by means of a detector commonly referred to as a gamma camera. Such a camera may be used in PET (Positron Emission Tomography) or SPECT (Single Photon Emission Computed Tomography) modalities and may feature a detector head including a round or rectangular camera plate optically coupled to a corresponding two-dimensional array of position-sensitive photodetectors, typically photomultiplier tubes (PMTs). The array of photodetectors may have a view of the camera plate which is typically about 30 centimeters or more in its major dimension. Detector heads weighing hundreds of pounds are used to make two-dimensional images, sometimes in a stationary mode and sometimes in a scanning mode. They can also be used to make three dimensional images by taking a plurality of views of the same target from different angles and using computer logic image reconstruction techniques. This may or may not include the use of time of flight measurements.

A so-called "gamma camera plate" is a large area device for converting radiation to light and is most commonly an assembly of a scintillator in the form of a crystal slab, such as sodium iodide doped with thallium for activation, which is hermetically sealed in a housing. The housing is made up of a shallow aluminum pan "back cap" covered with a glass optical window bonded to the back cap about its perimeter. An optical interface is typically provided between the crystal and the window to improve the coupling.

In operation, radiation from the target enters the crystal from the back cap radiation entrance side of the camera plate. The radiation interacts with the scintillator to result in scintillation light inside it. The light passes out of the plate through the optical window and into an array of PMTs which are coupled to its outside surface to convert the light to electrical signals. The electrical signals are fed to a digital processor for the construction of image information in a graphic form. The processor software may have the capability for accounting to some extent for spreading of the light inside the crystal between the point of its creation and its exit from the window into the photomultipliers. The spreading results in some loss of reconstructed image resolution and is undesirable in that respect, but it is at the same time also necessary to some extent for determination of position information by comparing the signal response of several nearby photomultiplier tubes to the same scintillation event.

In imaging applications, radiation detectors continue to suffer from lower resolution at the edges of the detector ("edge effect"), which may reduce the useful area of the scintillator. This effect is caused by radiation events occurring near an edge of the scintillator that are reflected from that edge making it more difficult to accurately determine the position of such events. In practice, it is not always possible to center the detector over the area of interest, making edge resolution potentially important. Various solutions to edge effect have been proposed, including the use of diffuse reflectors (see, for example, U.S. Pat. No. 4,284,891 to Pergrale et al.) and one or more light guides provided in a peripheral region of a scintillator or optical window close to an edge (see, for example, U.S. Pat. No. 7,138,638 to Juni).

SUMMARY

In one embodiment an assembly is provided having a scintillator comprising a face and a reflector constructed and arranged to redirect a majority of light leaving the face of the scintillator at an angle within a range of 45 to 135 degrees compared to the direction in which the light was traveling when it left the face.

In another embodiment a method of detecting radiation is provided. The method includes receiving radiation into a scintillator having a face, producing light with the scintillator in response to the radiation, allowing at least a portion of the light to leave the face, and reflecting a majority of the light leaving the face at an angle within a range of 45 to 135 degrees compared to the direction in which the light was traveling when it left the face with a reflector.

In another embodiment a reflector is provided including a plurality of prisms having a first face and a second face and further comprising a barrier on the first face.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1A:
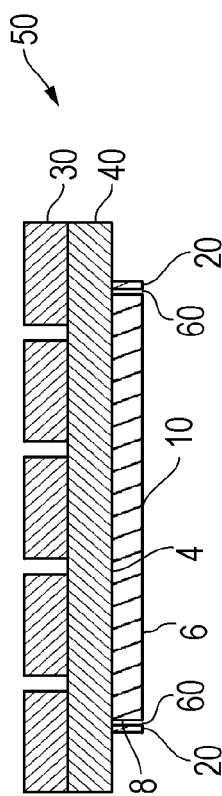
FIG. 1A is a side view of a detector according to one embodiment.
Figure 1B:
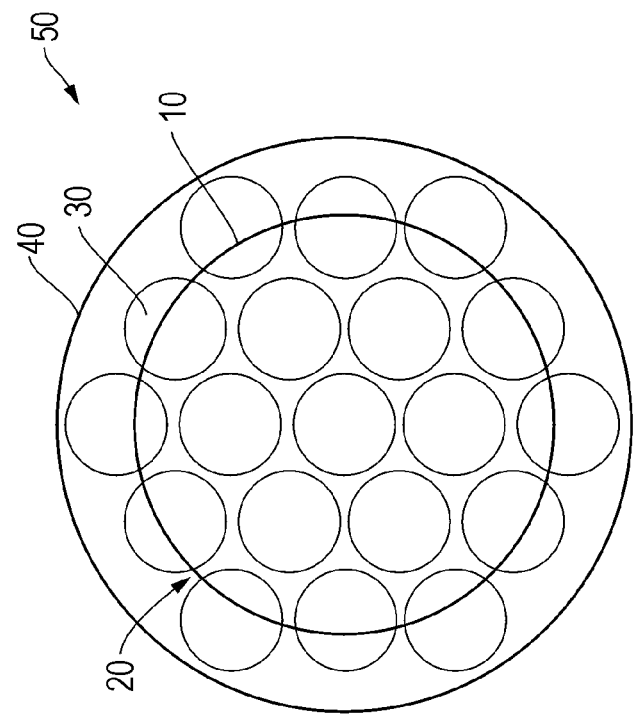
FIG. 1B is a top, schematic view of the detector of FIG. 1A.

Referring to FIGS. 1A and 1B, an embodiment includes an assembly 50, which may be in the form of a radiation detector, having a scintillator 10 comprising a face 8 and a reflector 20 constructed and arranged to redirect a majority of light leaving the face of the scintillator at an angle within a range of 45 to 135 degrees compared to the direction in which the light was traveling when it left the face. In certain embodiments the assembly may further include photodetectors 30, a window 40, and/or a couplant 60. While the overall detector illustrated herein is circular, it should be appreciated various other regular and irregular shapes may be selected based on the application and other factors.

As used herein, a scintillator is any device capable of converting radiation into light. Reference herein to "radiation" is to any ionizing radiation, but typically gamma radiation. The light generated may include any wavelength that is capable of reflection by the reflector and detection by a photodetector and need not include all, or any, visible light.

According to certain embodiments, particular materials are used for scintillator construction that have desirable properties for a particular radiation detection application. Properties that may be considered in selecting a scintillator include radiation stopping power, light output, decay time, and the like. In one embodiment, the scintillator is an inorganic material that is an intrinsic scintillator or extrinsic scintillator plus a suitable dopant. Such a material may be single crystal or a ceramic, so long at it has sufficient clarity to provide the desired level of light output for the given application, single crystals typically exhibiting superior clarity. Inorganic scintillators may include rare earth silicates such as lutetium yttrium oxy-orthosilicate, rare earth halides such as lanthanum chloride or bromide, alkali-halides such as sodium iodide, and the like. The particular crystal selected may vary based on the application. In general, relatively high light output crystals with good energy resolution (e.g., NaI, lanthanum bromide) are preferred over relatively dense crystals having short decay times (e.g., LYSO, BGO) for SPECT cameras, because brightness and energy resolution may affect spatial resolution more than density and speed. In PET the opposite is generally true because density may be more desirable where the gamma energies are higher. In addition, decay time may be important for coincident timing. In another embodiment, the scintillator may be an organic material such as a plastic, and in particular embodiments, cyclic compounds with pi-orbital electron structure. Specific examples of organic scintillators include crystalline anthracene, polyvinyl toluene, and napthalene doped acrylic. Such organic scintillators may be more suited for measuring neutrons and protons for cargo scanning or material science than for the gamma rays typically used in medical scanning.

Embodiments of scintillators may vary in size and shape depending on the application. Referring again to FIGS. 1A and 1B, in most embodiments, scintillators include opposing faces 4, 6 facing toward and away from the photodetectors, respectively, and at least one additional face 8, which can be considered the edge of the scintillator. For example, where the scintillator is rectangular, there may be four such edge faces, while a round scintillator may have only one.

Particular embodiments of scintillators may comprise a single piece or a number of smaller pieces, such as pixels. The example embodiment illustrated in FIGS. 1A and 1B includes one, single crystal scintillator. For example, one embodiment that has scintillators in the form of pixels may include pixels that measure 1, 2, or a few millimeters across the face directed toward the photodetector. Such pixels may be deeper than they are wide to provide a desired level of stopping power for the particular embodiment.

In another embodiment a scintillator, for example, in a gamma camera, may comprise a single crystal that may be 10 or less to 25, to 50, to 75, to 100 or more centimeters wide across a face directed toward the photodetector but relatively shallow compared to its width, such as on the order of one or two cm thick for particular embodiments. Relatively large single crystal scintillators such as those typically employed in gamma cameras may be particularly suited to use in embodiments because of the lack of separate pixels to help define light origin and because of the potentially more dramatic differences in light behavior between the edge and non-edge regions of the scintillator. Nonetheless, embodiments may still improve resolution in pixilated scintillators, particularly where there are fewer photodetectors than pixels and some form of positioning is desired.

A reflector may include a variety of embodiments suitable to be constructed and arranged to redirect a majority of light leaving the face of a scintillator at an angle within a range of 45 to 135 degrees compared to the direction in which the light was traveling when it left the face. This is in contrast to a prior art arrangement of a diffuse reflector roughly parallel to the face of the scintillator toward such reflector and roughly perpendicular to the face of the scintillator toward the photodetector(s). Such a reflector would, if perfectly diffuse, reflect only half the light leaving the face of the scintillator at an angle within a range of 45 to 135 degrees compared to the direction in which the light was traveling when it left the face and in practice would reflect substantially less in this range. In particular embodiments, the reflector may be constructed and arranged to redirect a majority of light leaving the face of a scintillator at an angle within a range of 50 to 130, 60 to 120, or 75 to 105 degrees compared to the direction in which the light was traveling when it left the face.

In particular embodiments, the reflector comprises a reflective face that lies along a first plane that intersects a second plane that lies along the face of the scintillator toward the reflector. Where such face or faces are not perfectly flat, a best-fit plane may be considered the plane that lies along a face. In some embodiments, the first plane may intersect the second plane at an angle within a range of 15 degrees to 165 degrees.

Embodiments of a reflector may include a specular reflector. Such a specular reflector may be placed at an angle compared to the face of the scintillator toward it and may redirect light based on the angle of placement. In one particular embodiment, where the face of the scintillator toward the reflector is at about a right angle to the face of the scintillator toward the photodetector(s), a specular reflector may be placed at an angle of about 30, 45, or 60 degrees compared to the face toward it.

Figure 5:
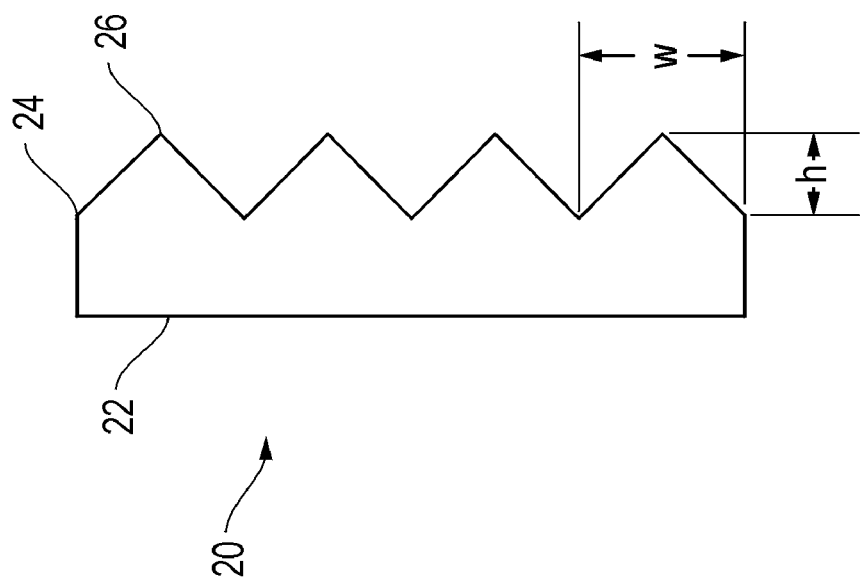
FIG. 5 is a side view of a reflector according to one embodiment.

In another embodiment, a reflector may include a prism. Embodiments of the reflector may also have periodic surface features, such as in the case of a microprism film. Such features may be regular or irregular, but typically would be regular prisms in a microprism film. As illustrated in FIG. 5, in one embodiment a microprism film may comprise a sheet of material having a smooth side 22 and a side 24 having a series of microprisms 26 with a width w and a height h positioned and angled to bias the light upward and downward compared to the sides of the film. In typical embodiments the surface features have an average height significantly larger than the wavelength of light, such as not less than 1 μm or more typically not less than 10 μm, 20 μm, or even 50 μm. Smaller features may allow for a thinner reflector. Commercially available microprism films include Vikuiti Transmissive Right Angle Film (TRAF) II available from 3M of St. Paul, Minn.

Reflectors which add relatively little width to the detector when arranged to redirect light may be particularly desirable because, for example, they may facilitate medical imaging in areas such as the head and heart where space may be limited. Microprism films are an example of a reflector that will typically add little width to the detector and are therefore particularly desirable for certain embodiments.

Microprism film may be beneficially applied with either the smooth side or the side with the microprisms toward the scintillator, though the smooth side may be easier to optically couple to the scintillator and is shown in computer models to provide performance advantages in reducing edge effect. Where the smooth side of the film is away from the scintillator, it may be coated or otherwise in contact with a specular (mirror-like) or diffuse reflector.

Figure 6:
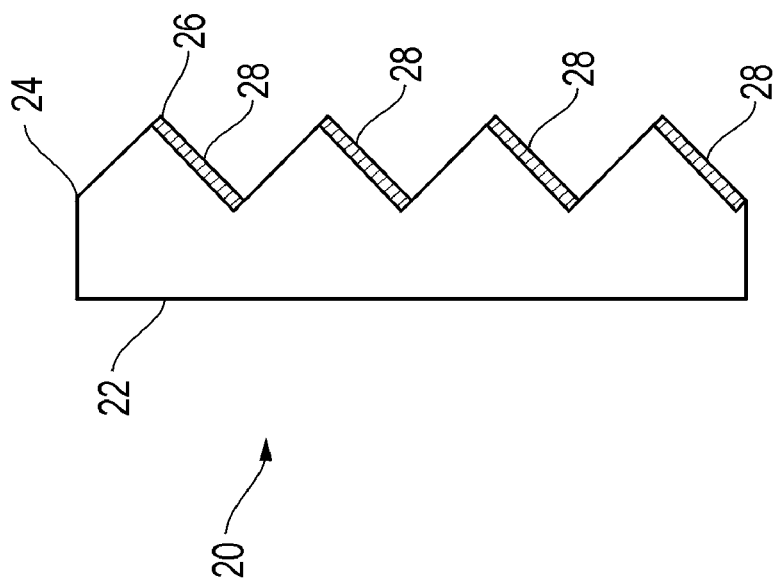
FIG. 6 is a side view of a reflector according to one embodiment.

In particular embodiments, surface features of a reflector may be treated such that light is directed out of only certain faces of the material. In the example embodiment of FIG. 6, microprisms 26 have a barrier 28 on one face which limits the way the light can be directed, potentially improving light collection and resolution of the image. In particular embodiments, barrier 28 may comprise a coating or layer, such as a diffuse or specular reflector.

As used herein "optically coupled" means that the coupled objects are arranged such that light can pass out of one and into the other. Typically this means that light-passing faces of the objects are adjacent or in contact with one another. In particular embodiments additional objects or materials may be used to couple the two objects such as a light pipe, fiber optic line, optical grease, epoxy, silicone rubber or even air or another gas or relative vacuum. In embodiments where the objects to be optically coupled comprise a microprism film and a scintillator, the film may be coated onto the scintillator or simply placed adjacent to it, as well as coupled with a couplant. In the embodiment of FIG. 1A, a couplant 60 optically couples reflector 20 to scintillator 10.

Referring again to FIGS. 1A and 1B, assembly 50 of the present invention may take the form of a radiation detector and may comprise one or more photodetectors 30. Photodetectors may be any device able to convert light from a scintillator into a form that can be recorded. To facilitate electronic recording and manipulation of the data, typically the light is converted to an electrical signal. Common photodetectors include PMTs and photodiodes. The size, shape, nature, and arrangement of the photodetector(s) may be selected to provide sufficient coverage of the scintillator and to benefit resolution.

The photodetectors may be optically coupled to the scintillator in any way that allows the light to be received from the scintillator with sufficient efficiency for the given application. In addition, the optical coupling may be arranged such that the photodetectors are not immediately adjacent to the scintillator, which may promote spreading of the scintillation light and thus positioning. In addition, the optical coupling may be arranged such that it forms a seal around the scintillator, which may be particularly desirable where the scintillator may be damaged by the environment it is to be used in, such as where the scintillator is a hygroscopic crystal. In the example embodiment of FIGS. 1A and 1B the scintillator and photodetectors are optically coupled using a window 40. The window may be formed of a variety of light-transferring materials such as glass or plastic. The selection of the material may be based on the cost, ease of machining (plastic generally being cheaper and easier to machine than glass), sealing properties (glass favored over plastic for hermetic sealing) and the like.

Figure 7:
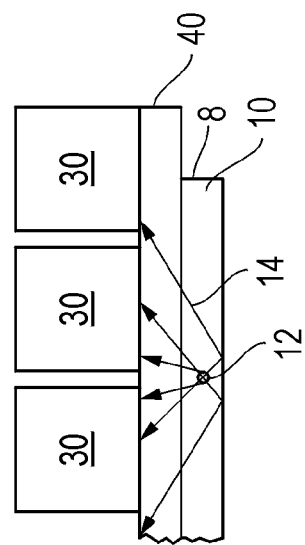
FIG. 7 is an illustration of light traveling in a prior art detector.
Figure 8:
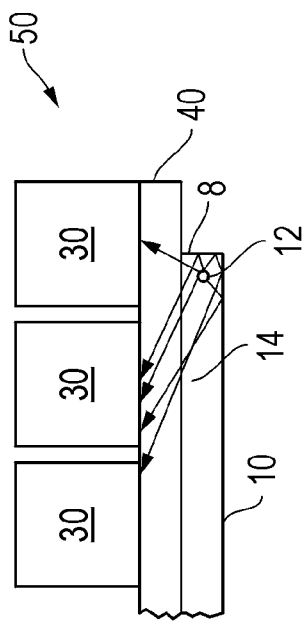
FIG. 8 is an illustration of light traveling in a prior art detector.

The edge effect generated by typical prior art detectors is illustrated in FIGS. 7 and 8. In FIG. 7, a radiation event generates light at point 12 and photons travel, for example, as illustrated by arrows 14. Because point 12 is away from side face 8 of scintillator 10, light strikes photodetectors 30 in an amount generally proportional to their proximity to point 12, allowing the location of the point to be identified. In this example, the edge effect is not significant. Turning now to FIG. 8, a radiation event triggering light at a point 12 near face 8 of scintillator 10 is illustrated. As illustrated by arrows 14, in this case rather than the light striking the photodetectors 30 in an amount proportional to their proximity to point 12, the light is scattered by the face of the scintillator. In this example the edge effect is significant.

Figure 9:
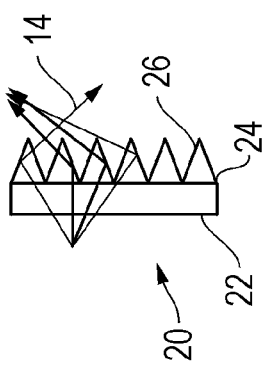
FIG. 9 is an illustration of light traveling through a reflector according to one embodiment.
Figure 10:
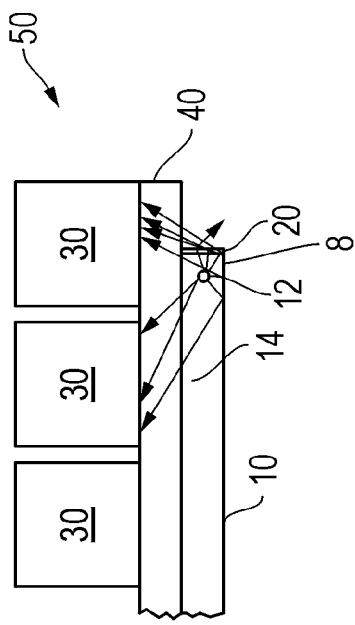
FIG. 10 is an illustration of light traveling in a detector according to one embodiment.

Turning now to the embodiment illustrated in FIG. 10, a detector is arranged similarly to those illustrated in FIGS. 7 and 8, but in this instance a reflector 20 in the form of a microprism film is optically coupled to the edge of scintillator 10. When light is generated at a point 12 near face 8 of this embodiment, a portion of the light leaving the face of the scintillator is redirected to adjacent photodetectors rather that being reflected back into the scintillator. This reduces the edge effect. FIG. 9 illustrates more specifically how light represented by arrows 14 is redirected by angled reflector 20.

Example

Figure 2:
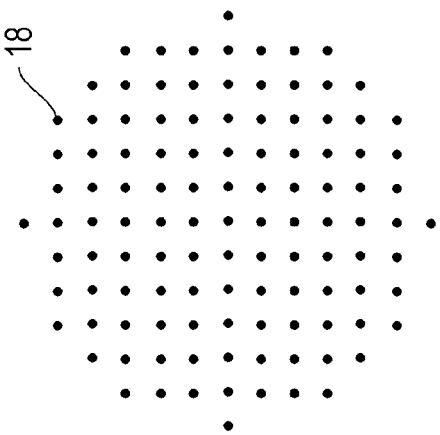
FIG. 2 is a pattern of scintillation events according to one embodiment.

A computer model was generated and run to compare the edge effect of a conventional detector and a detector according to one embodiment. The detector used in the simulation was as illustrated in FIGS. 1A and 1B. For this purpose the scintillator was modeled as a 60 mm diameter, 10 mm thick sodium iodide single crystal optically coupled to photodetectors in the form of PMTs with a 10 mm thick glass window. The scintillation input was modeled in a pattern known as a "dot phantom" comprising scintillation events 18 at 5 mm spacing and illustrated in FIG. 2.

Figure 3B:
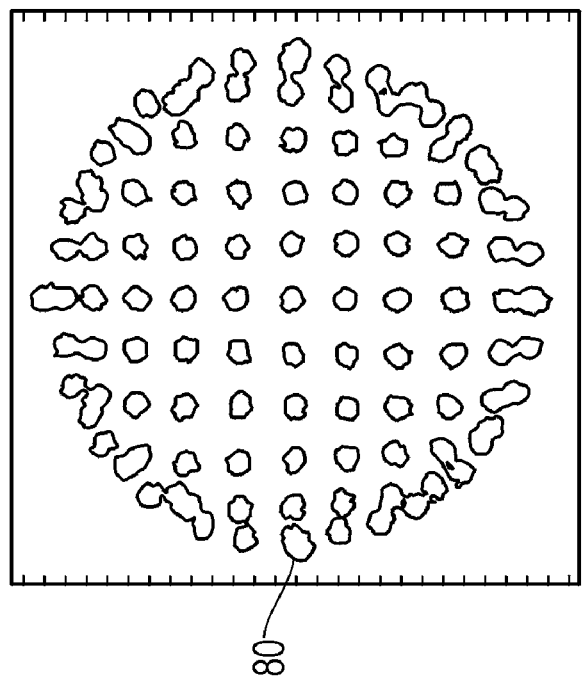
FIG. 3B is a model of an image output according to one embodiment.
Figure 3A:
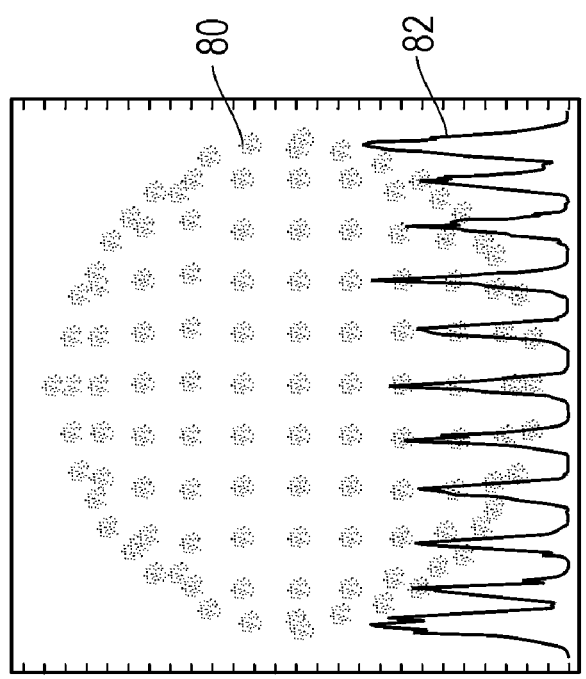
FIG. 3A is a model of event positioning according to one embodiment.

First, the model was run with the edge of the scintillator behaving as is conventional Teflon® PTFE diffuse reflector as used in the prior art. This model generated the light output (also referred to as "event positioning") illustrated in FIG. 3A, which was interpreted by traditional image analysis software in such systems (weighted vector algebra) to give the output shown in FIG. 3B. Waveform 82 is a cross-section through the midline of the image of the number of events per image pixel. The taller and narrower each peak, the better resolved the image is. Note that event position 80 is the combination of two scintillation events, and that other event records produced near the edge of the scintillator are also muddled. In other words, the image is relatively poorly resolved due to edge effect.

Figure 4B:
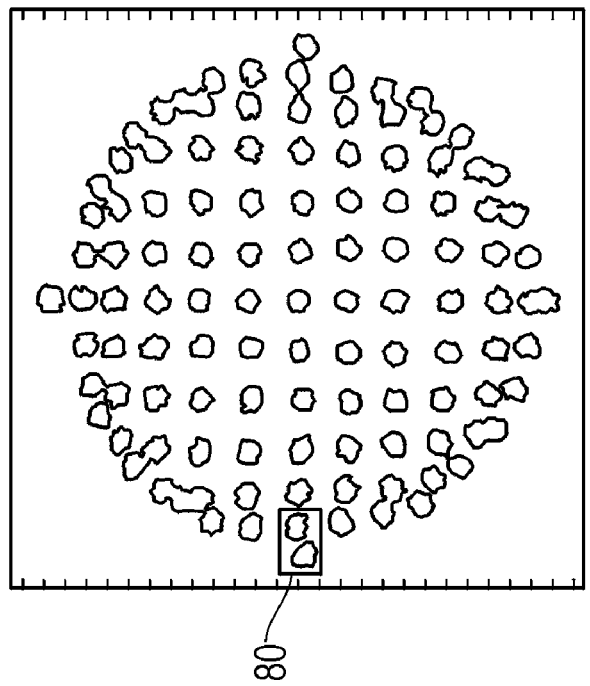
FIG. 4B is a model of an image output according to one embodiment.
Figure 4A:
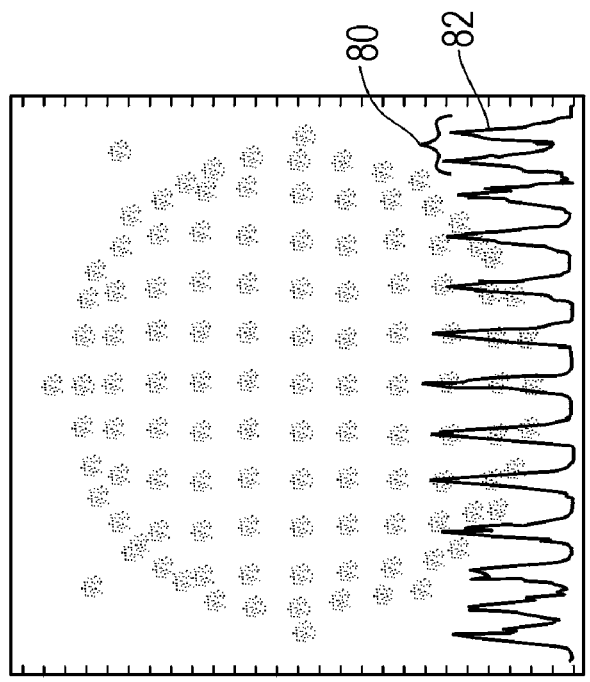
FIG. 4A is a model of event positioning according to one embodiment.

Second, the model was run with the edge of the scintillator behaving as is if coupled to an angled reflector in the form of a microprism film having 50 micron wide prisms. This model generated the light output illustrated in FIG. 4A, which was again interpreted to give the output shown in FIG. 4B. Note that event positions(s) 80 show two distinct scintillation events, and that other event records produced near the edge of the scintillator are also clearer than in FIGS. 3A and 3B. In other words, the image has relatively good resolution due to reduced edge effect.

The foregoing example demonstrates that particular embodiments of radiation detectors described herein may have reduced edge effect. The example also demonstrates that use of reflectors according to particular embodiments to redirect scintillation light from the side of a scintillator into nearby photodetectors may improve the efficiency and resolution of the detectors compared to the diffuse reflectors and light guides of the prior art.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An assembly, comprising:
a scintillator comprising opposing faces configured to face toward and away from a photodetector and a side face at a right angle to the opposing faces; and
a reflector constructed and arranged to redirect a majority of light leaving the side face of the scintillator at an angle within a range of 45 to 135 degrees compared to the direction in which the light was traveling when it left the side face.

2. The assembly of claim 1, wherein the scintillator comprises a single crystal.

3. The assembly of claim 2, wherein the single crystal is selected from the group consisting of rare earth oxy-orthosilicates, rare earth halides, and alkali halides.

4. The assembly of claim 1, wherein the photodetector optically is coupled to the scintillator.

5. The assembly of claim 4, further comprising a window optically coupling the photodetector to the scintillator.

6. The assembly of claim 5, wherein the scintillator comprises a hygroscopic material and the window forms part of a seal around the scintillator.

7. The assembly of claim 4, wherein the photodetector comprises a photomultiplier tube.

8. The assembly of claim 1, wherein the reflector comprises a reflective face that lies along a first plane that intersects a second plane that lies along the face of the scintillator.

9. The assembly of claim 8, wherein the first plane intersects the second plane at an angle within a range of 15 degrees to 165 degrees.

10. The assembly of claim 8, wherein the reflector comprises a prism.

11. The assembly of claim 1, wherein the assembly comprises a portion of a radiation detector.

12. The assembly of claim 11, wherein the detector is constructed and arranged for medical imaging.

13. The assembly of claim 11, wherein the detector is constructed and arranged as a gamma camera.

14. An assembly of claim 1, wherein the reflector comprises a plurality of prisms having a first face and a second face and further comprises a barrier on the first side.

15. The reflector of claim 14, wherein the reflector comprises a microprism film.

16. An assembly, comprising:
a scintillator comprising a face; and
a reflector constructed and arranged to redirect a majority of light leaving the face of the scintillator at an angle within a range of 45 to 135 degrees compared to the direction in which the light was traveling when it left the face, wherein:
the reflector comprises a reflective face that lies along a first plane that intersects a second plane that lies along the face of the scintillator and
the reflector has periodic surface features.

17. The assembly of claim 16, wherein the surface features have an average height of not less than 10 μm.

18. The assembly of claim 17, wherein the reflector comprises a microprism film.

19. The assembly of claim 18, wherein the microprism film comprises a first side which comprises a plurality of surface features in the form of prisms and a second side substantially devoid of prisms, the second side oriented toward the scintillator.

20. The assembly of claim 18, wherein the microprism film comprises surface features comprising a plurality of prisms and having a barrier on at least one face of the plurality of prisms.

21. The assembly of claim 20, wherein the barrier comprises a specular reflector.

22. A method of detecting radiation, comprising:
receiving radiation into a scintillator comprising opposing faces configured to face toward and away from a photodetector and a side face at a right angle to the opposing faces;
producing light with the scintillator in response to the radiation;
allowing at least a portion of the light to leave the side face; and
reflecting a majority of the light leaving the side face at an angle within a range of 45 to 135 degrees compared to the direction in which the light was traveling when it left the side face with a reflector.

* * * * *